Nov. 30, 1948.     D. B. BAIMA     2,455,155
FISH LURE
Filed Aug. 1, 1946
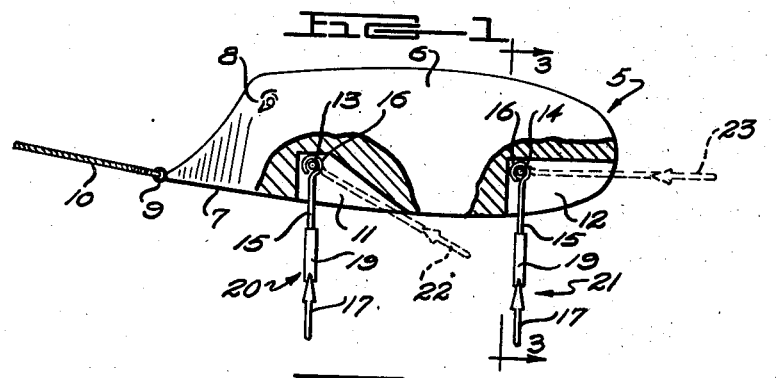
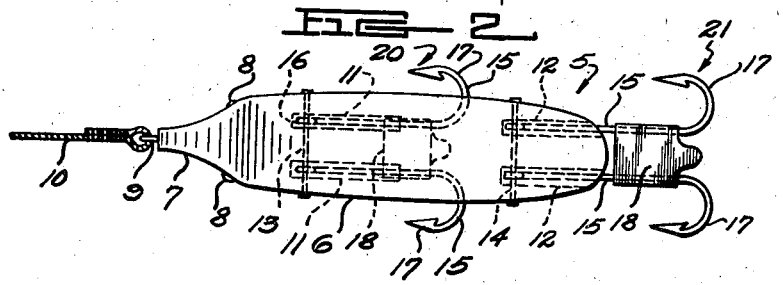
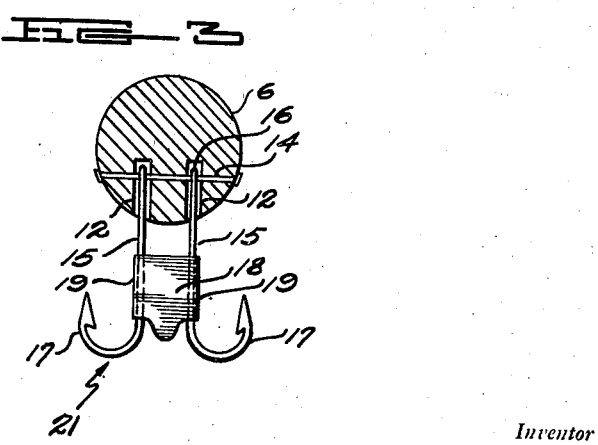
Inventor
DOMINICK B. BAIMA
By *Clarence A. O'Brien and Harvey B. Jacobson*
Attorneys Patented Nov. 30, 1948

2,455,155

UNITED STATES PATENT OFFICE 2,455,155

FISH LURE

Dominick B. Baima, Detroit, Mich.

Application August 1, 1946, Serial No. 687,759

1 Claim. (Cl. 43—46)

This invention relates to new and useful improvements and structural refinements in fish lures, and the principal object of the invention is to provide a device of the character herein described, in which fish hooks are arranged in the form of movable legs attached to the body portion of the lure, whereby the device as a whole produces a realistic, life-like appearance and movement when in use.

A further use of the invention is to provide a fish lure which is of simple construction and which cannot easily become damaged.

Another object of the invention is to provide a fish lure which may be employed with equal effectiveness for all forms of fishing.

An additional object of the invention is to provide a fish lure which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention, partially broken away to reveal its construction.

Figure 2 is a top plan view thereof, and

Figure 3 is a cross sectional view, taken substantially in the plane of the line 3—3 in Figure 1.

Like characters of reference are used to designate like parts in the specification and throughout the several views.

Referring now to the accompanying drawings in detail, the invention consists of a fish lure designated generally by the reference character 5, the same embodying in its construction a substantially cylindrical body 6, configurated substantially as shown. The forward portion of the body 6 forms a flattened, pointed head 7 and may be provided with a pair of suitable eyes 8.

A loop 9 is also provided at the nose portion of the head 7, for the purpose of attaching the entire lure to a fishing line 10.

The lower portion of the body 6 is formed with two pairs of spaced parallel, transversely aligned recesses 11 and 12, the recesses being configurated substantially as shown in the drawings and a pair of pins 13, 14 respectively being positioned in the body and extending through the respective pair of recesses, as is best shown in Figure 3. The end portions of the pins may be peened over, whereby the pins are retained in position.

A pair of spaced parallel fish hooks 15 of conventional design are suspended by the eyes 16 thereof from each of the pins 13, 14, the bill portion 17 of the hooks 15 being out-turned to the sides of the body 11, as is best shown in Figures 2 and 3.

A flat plate forming what may be referred to as a paddle 18, rigidly secures together each pair of the hooks 15, this being accomplished by arcuating the lateral edge portion of the plate around the hooks, as is indicated at 19. In this manner, each pair of the hooks 15 together with the associated plate 18 will form a pair of legs for the body portion 6, the same being generally designated as the front legs 20 and the rear legs 21.

It should be understood that the pairs of legs 20, 21 are freely swingable on the respective pins 13, 14, so that when the invention is placed in use, the legs will rise as indicated by the phantom lines 22, 23 and again fall in accordance with the propulsion of the lure through the water.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A fish lure comprising in combination, a substantially cylindrical body formed in the lower portion thereof with two pairs of spaced parallel, transversely aligned recesses, a pair of pins positioned in said body, each of said pins extending through one pair of said recesses, a pair of spaced parallel fish hooks pivotally suspended from each of said pins, the bills of said hooks being out-turned to the sides of said body, and a paddle rigidly securing together the hooks in each pair.

DOMINICK B. BAIMA.

REFERENCES CITED

The following references are of record in the file of this patent:

UNITED STATES PATENTS

| Number | Name | Date |
|---|---|---|
| 1,069,093 | Faught | July 29, 1913 |
| 1,750,783 | Pemberton | Mar. 18, 1930 |
| 2,281,809 | Smith | May 5, 1942 |